US012243414B1

(12) United States Patent
Puckett et al.

(10) Patent No.: US 12,243,414 B1
(45) Date of Patent: Mar. 4, 2025

(54) INTELLIGENT DYNAMIC WORKFLOW GENERATION

(71) Applicant: Ubiety Technologies, Inc., Chicago, IL (US)

(72) Inventors: Keith Puckett, Chicago, IL (US); Michael B. Cox, Chicago, IL (US); Joseph Loftus, Seattle, WA (US); Samuel Frakes, Chicago, IL (US); Cameron Miller, Chicago, IL (US); Luis Castañeda Lopez, Chicago, IL (US); Victoria Nakagawa, Chicago, IL (US); Erik Hanson, Winchester, CA (US)

(73) Assignee: Ubiety Technologies, Inc., Chicago, IL (US)

( * ) Notice: Subject to any disclaimer, the term of this patent is extended or adjusted under 35 U.S.C. 154(b) by 0 days.

(21) Appl. No.: 18/750,885

(22) Filed: Jun. 21, 2024

(51) Int. Cl.
*G08B 31/00* (2006.01)
*G08B 27/00* (2006.01)

(52) U.S. Cl.
CPC ............ *G08B 31/00* (2013.01); *G08B 27/005* (2013.01)

(58) Field of Classification Search
CPC ..... H04M 3/436; G08B 25/00; G08B 25/006; G08B 25/004; G06V 20/52; G06V 10/7792
See application file for complete search history.

(56) References Cited

U.S. PATENT DOCUMENTS 10,109,166 B1 10/2018 Selinger et al.
10,304,303 B2 5/2019 Selinger et al.
10,382,282 B1 8/2019 Levy-Yurista
11,792,455 B1 * 10/2023 Fu .......................... G06V 10/82 315/297
2013/0128311 A1 5/2013 Kim
2014/0046711 A1 * 2/2014 Borodow ....... G06Q 10/063114 705/7.15
2017/0223754 A1 8/2017 Li
2020/0045647 A1 2/2020 Gupta
2020/0238991 A1 7/2020 Aragon
(Continued)

OTHER PUBLICATIONS

A Study on Device Identification from BLE Advertising Packets with Randomized MAC Addresses Akiyama et al. (Year: 2021), 4 pgs.

*Primary Examiner* — Mirza F Alam
(74) *Attorney, Agent, or Firm* — Perkins Coie LLP

(57) ABSTRACT

Machine learning-based methods are disclosed to intelligently generate dynamic workflows, such as dynamic call lists and priority levels of alarm notifications. To generate a dynamic call list based on an alarm notification, the system may identify electronic devices present in an area using emitted passive electromagnetic signals (e.g., RF signals such as Bluetooth, WiFi, and/or cellular). The identification of the electronic devices may be associated with known and/or unknown individuals on the premises. The RF signal data may be processed using at least one ML model to determine the severity of the alarm. Based on the processed data, the system may assign a priority level to the alarm, where the priority level may range from level 0 (no action) to level 4 (dispatch law enforcement immediately). The disclosed methods use trained machine learning models to generate a dynamic call list and identify false alarms with increased accuracy.

20 Claims, 9 Drawing Sheets

(56) References Cited

U.S. PATENT DOCUMENTS

| | | | | |
|---|---|---|---|---|
| 2021/0136178 | A1 | 5/2021 | Casey | |
| 2022/0051548 | A1* | 2/2022 | Pellegrini | H04M 3/436 |
| 2023/0316726 | A1* | 10/2023 | Selinger | G06V 20/52<br>382/159 |
| 2023/0351873 | A1* | 11/2023 | Vazirani | G08B 29/188 |

* cited by examiner

INTELLIGENT DYNAMIC WORKFLOW GENERATION

CROSS-REFERENCED PATENT APPLICATIONS

U.S. patent application Ser. No. 18/436,772, filed Feb. 8, 2024, entitled "DETECTION OF ELECTRONIC DEVICE PRESENCE USING EMITTED WI-FI SIGNALS," U.S. patent application Ser. No. 18/436,820, filed Feb. 8, 2024, entitled "DETECTION OF ELECTRONIC DEVICE PRESENCE USING EMITTED BLUETOOTH LOW ENERGY SIGNALS," and U.S. patent application Ser. No. 18/750,866, filed Jun. 21, 2024, entitled "ELECTRONIC DEVICE IDENTIFICATION USING EMITTED ELECTROMAGNETIC SIGNALS" are hereby incorporated by reference in their entirety.

BACKGROUND

In traditional home and business security systems, when an alarm is triggered, a monitoring center will typically receive an alert and then contact the individuals on a predefined call list to assess whether the alarm is legitimate or false. The monitoring center is usually provided with a static list of individuals to contact in order when an alarm is triggered. One shortcoming of this process is that the monitoring centers may have to make several calls to various individuals on the static call list before reaching an individual that is present at the premises who can verify whether a legitimate threat exists or if the alarm is a false alarm. Outgoing calls can sometimes take 30-60 seconds in length, so in a scenario where five individuals are listed on a static call list and the fifth person listed is the one individual on the premises, the monitoring center may have to spend up to four minutes calling individuals on the list before reaching the fifth person on the list who can verify whether the alarm is legitimate or false.

The Monitoring Association (TMA) has a standard called TMA-AVS-01 that grades alarm notifications into 5 categories:

- Level 0—no call for action/no alarm
- Level 1—call for action with no additional information (the majority of alarm notifications are graded at this level)
- Level 2—call for action and confirmed human presence onsite
- Level 3—call for action and confirmed threat to property
- Level 4—call for action and confirmed threat to life Presently, monitoring centers use human judgment to assign levels of alarm notifications. After making a phone call to a homeowner, the monitoring center representative is tasked with deciding which level to assign to the alarm. Human judgment is rife with errors when it comes to accurately assigning levels to the alarm notifications, which in turn causes law enforcement to lose trust in the alarm grading system. For example, if law enforcement is repetitively dispatched to attend to a false alarm, law enforcement will be reluctant to act on future alarm notifications that may not be false alarms. Because the monitoring center and first responders/law enforcement are not presented with real-time and accurate information of the premises, many alarms are incorrectly categorized as either too high (e.g., categorizing an alarm as level 3 or 4 when it was a false alarm) or too low (e.g., categorizing an alarm as a level 0 when it was indeed a level 3 or level 4 alarm).

Traditional home and business security systems also lack a reliable way to quickly and easily assess the presence of people in a house or business, leading to high false-alarm rates, account churn, and low customer satisfaction. Motion and magnetic sensors are inadequate to identify details of intruders. Moreover, video surveillance can be invasive, expensive, as well as misidentify intruders. Mobile devices regularly broadcast electromagnetic signals in order to advertise their presence and actively discover access points in proximity. Such electromagnetic signals can include unique identifiers, such as the MAC address of mobile devices, and may also include a list of preferred networks accessed by these devices in the past. However, the emitted electromagnetic signals are typically complex and can contain many different fields of data, some of which may be incomplete. Therefore, traditional methods for detecting electronic devices based on electromagnetic signals are typically inadequate.

As such, a need exists to accurately and reliably track the presence of individuals around a premises and, based on the presence of those individuals around the premises, generate a dynamic call list that improves the efficiency of contacting certain individuals (as well as law enforcement) when an alarm is triggered on the premises. Additionally, a need exists to intelligently determine a level of priority of an alarm notification based on real-time information, such as the presence (or lack thereof) of individuals on premises.

It is with respect to these and other general considerations that the aspects disclosed herein have been made. Also, although relatively specific problems may be discussed, it should be understood that the examples should not be limited to solving the specific problems identified in the background or elsewhere in the disclosure.

BRIEF DESCRIPTION OF THE DRAWINGS

Detailed descriptions of implementations of the present technology will be described and explained through the use of the accompanying drawings.

Figure 1:
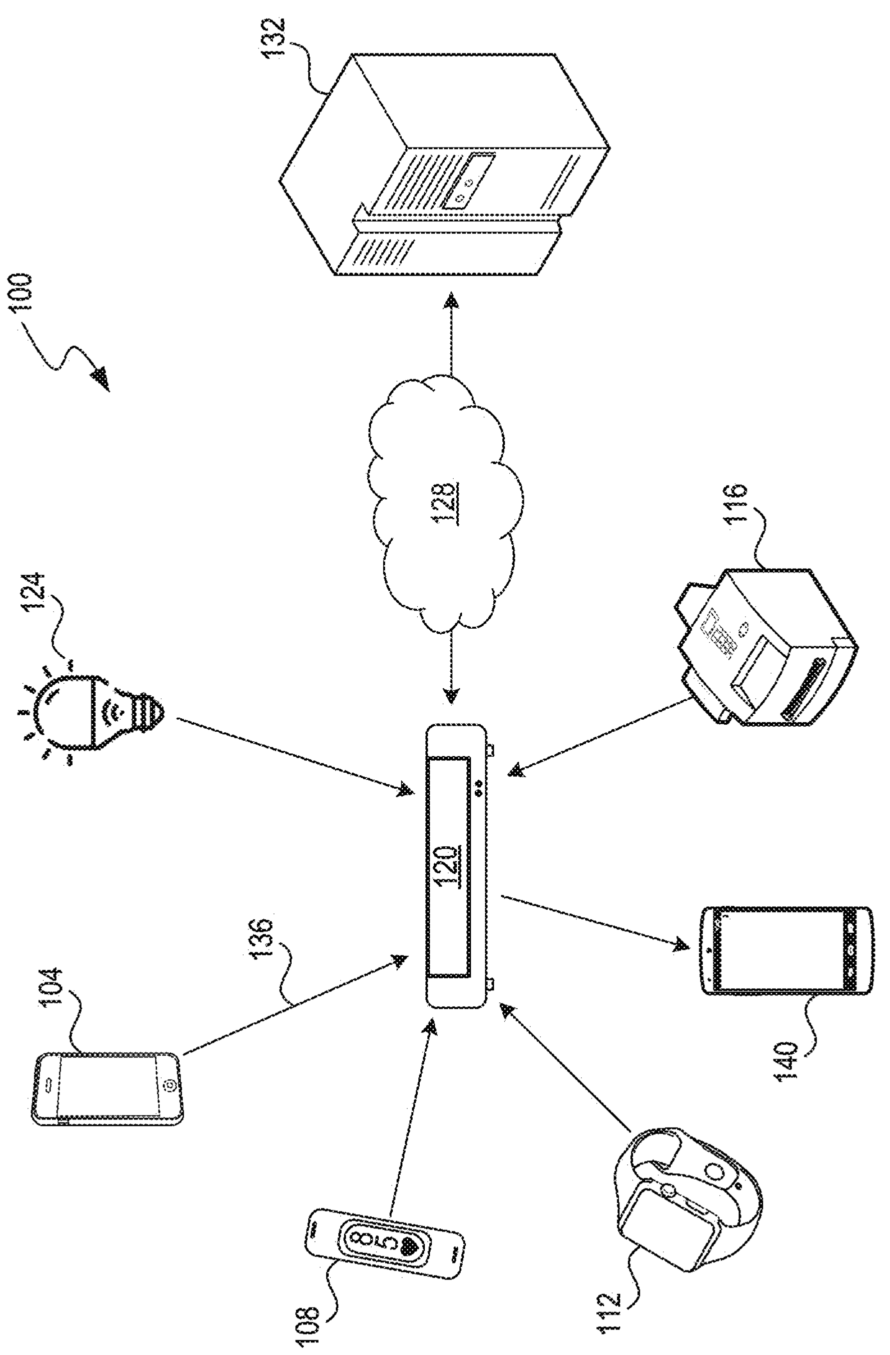
FIG. 1 is a block diagram that illustrates an example system that can implement aspects of the present technology.

The technologies described herein will become more apparent to those skilled in the art from studying the Detailed Description in conjunction with the drawings. Embodiments or implementations are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

This document discloses methods, systems, and apparatuses for rf-based dynamic workflow generation. "RF" refers to "radio frequency," which may encompass any telecommunications signal, including but not limited to Wi-Fi, cellular, Bluetooth, GPS, or other common protocols. Examples disclosed herein also describe improved detection of electronic device presence. The disclosed apparatuses listen for electronic device activity across a spectrum of frequency ranges. Using the disclosed systems, sensed device activity covers Wi-Fi signaling, cellular signaling, Bluetooth signaling, network discovery, and Wi-Fi fingerprinting. By listening for active as well as passive signals emitted by devices, the disclosed apparatuses collect pseudonymous attributes and identifiers from devices and networks. The disclosed methods augment device detection with context determined through artificial intelligence (AI) using both real-world and synthetically-generated data to expand anomaly detection and overall understanding of presence. The radio frequency signals detected are transformed using AI into valuable insights and actionable data. Moreover, the disclosed cloud infrastructure is architected to process raw data and scale in real-time. The cloud infrastructure provides a backbone to the presence detection ecosystem, translating raw data to insights at high levels of reliability, efficiency, and accuracy.

Specifically, the data that is captured and analyzed by the various AI models disclosed herein may be used to generate a dynamic call list when an alarm is triggered at a premises. For example, based on the presence of certain devices at a premises, the system disclosed herein may accurately predict the identity of individuals on premises and off premises. A static call list may list a certain individual as the first caller when an alarm is triggered; however, if that first individual is not present on the premises, then the system may dynamically reorder the call list and place another individual who is on premises (e.g., based on the data received from their devices and other related data) as the first caller.

In some embodiments, various Internet-of-Things (IoT) devices may be setup at a premises that transmit and receive RF signals from nodes. Nodes may include WiFi routers, cellular towers, satellites, and other similar signal transmission devices. The nodes may receive signals from devices on premises. These signals may then be relayed to a central data center (e.g., cloud or otherwise) where the signals are analyzed. The signals may be cross-checked against known data that identifies the devices and the individuals that own these devices. For example, in some embodiments, the central database may contain a table of individuals that reside at the premises (e.g., a house) and devices that are associated with each individual (e.g., cell phone, tablet, smart television, etc.). Based on the on-premises data received by the central data center, the data center may then predict with a certain accuracy which individuals are on premises and whether unknown devices are on premises. This information from the data center may then be transmitted to an alarm monitoring center. The alarm monitoring center may receive this information to then determine which individuals to contact based on the triggering of an alarm. For example, when an alarm is set off, the alarm monitoring center may contact the individuals on premises first before contacting other residents who are not on premises.

In other embodiments, the system described herein may receive signal information from the nodes on premises and dynamically calculate the most efficient workflow for determining whether a triggered alarm is legitimate or accidental. For example, the systems may dynamically create a call list that prioritizes calling individuals onsite vs. individuals offsite. The system may also prioritize homeowners and their spouses vs. children and minors that reside on premises. In short, the system may dynamically reorder a call list based on the signal information received by the nodes. This new call list may be reordered on servers at a data center (e.g., via cloud infrastructure providers such as AWS and others), and the reordered call list may be presented to the alarm monitoring center as a suggested call list.

In some embodiments, the call list may be updated in real-time based on the devices present and not present on the premises. In other embodiments, the reordered call list may be transmitted and displayed directly in a mobile software application. For example, a homeowner who is away from the premises may receive a dynamic call list from the data center based on an alarm notification. The homeowner may then efficiently make calls to individuals on the list to determine if the alarm is legitimate or accidental.

In order to create a dynamic call list, the system may rely on trained artificial intelligence (AI) and/or machine learning (ML) models that have been trained on specific device data and on-premises data that give the model(s) a certain confidence regarding which devices are on premises and which individuals are associated with which devices. Throughout this application, the terms "AI models" and "ML models" may be used interchangeably. These trained AI models may be relied upon in generating the dynamic call list. For example, the AI model may be trained to recognize a certain device belongs to a minor who typically plays video games between 7 pm and 9 pm on certain days. If an alarm is triggered between 7 pm and 9 pm on a day that the minor usually plays video games, that individual may be deprioritized on the call list because the AI model may be trained to assume that the minor will not answer his phone because he is playing video games, wearing gaming headphones, etc. In another example, the AI model may receive five different alarm notifications that occurred at similar times and days during the week, and each of these alarm notifications were manually dismissed as accidental. The AI model may then be trained to suggest that an alarm that is triggered at that certain day and time (and perhaps with certain individuals present on premises) is most likely accidental and not legitimate.

After an alarm is triggered, the system may analyze the real-time RF-signal data from the nodes on premises to determine which devices are present or not present at the premises. Other information that may be obtained at this time is whether a device was present on premises but left the premises within a certain time window (e.g., a certain device left the premises 10 minutes ago). The devices that may emit RF signals to nodes on premises may include any IoT device, such as cell phones, laptops, security cameras, smart televisions, smart garage openers, smart doorbell systems, smart dog collars that have an embedded GPS signal, wearables, etc. Each of these devices may be initially associated with certain residents at a premises. Based on the locations of these devices/items or whether certain devices are turned "on" or "off," the system can make an intelligent prediction about who is actually on premises and who is not.

The data received from the nodes on premises may then be analyzed by the system, cross-referencing a database of static information as well as dynamic information from trained AI models. The system may then generate a dynamic call list, as well as determine a priority level of an alarm notification. For example, if an alarm notification is triggered at 5 pm while each resident is on premises, the priority of the alarm may be "low." However, if an alarm is triggered at 3 am, and no known individual is on premises but an unknown device is detected on premises, the alarm priority may be "high." In certain embodiments, upon the determination of a "high" priority alarm, law enforcement may be automatically dispatched to the premises regardless of whether calls have been initiated in the dynamic call list.

The dynamic call list and priority level may be transmitted to a monitoring center that may then initiate calling the individuals ranked in the call list. In some examples, outbound calls from the monitoring center may be automatically initiated based on receiving the priority data from the data center.

In some embodiments, the content of the outbound calls may be recorded and analyzed. The background noise and words stated on the call may be analyzed and dynamically affect the order of the call list. For example, during the first call to an individual on premises, glass breaking in the background was picked up as background noise by the system. The system may have received the audio file, processed it against trained AI models at a data center, and determined with a certain confidence threshold that the noise was indeed glass breaking. Based on this background noise data, the system may then update the alarm response workflow and suggest to the monitoring center to dispatch law enforcement immediately instead of calling the second individual in the dynamic call list.

The benefits and advantages of the implementations described herein include real-time and more accurate insights into the types of electronic devices present at a location, which in turn allow for (i) more efficient calling from a dynamic call list and (ii) more accurate grading of an alarm notification. Because mobile electronic devices are a strong indication of presence, the disclosed methods for detection and identification reduce unnecessary alerts and costly false-alarm dispatches. By adding known devices to their profiles, users obtain increased insight into when an electronic device enters their homes and whom it belongs to. In some examples, the disclosed systems reveal unknown or new devices that have not been previously connected to a certain network. Such device identification information can be revealed without the use of user input because the system disclosed herein may detect an unknown device by its broadcasted signals in proximity to a certain network.

By generating a dynamic workflow based on on-premises data, the monitoring center can more quickly determine if an alarm notification is severe or false. Such a determination can allow a monitoring center to dispatch law enforcement faster, thereby saving more lives. Further, the monitoring center can also more accurately determine if an alarm is false, thereby preserving the limited resources of first responders and law enforcement by not dispatching them to attend to a false alarm. Overall, implementing a RF-based dynamic workflow at the monitoring center will speed up the decision-making process of whether an alarm is legitimate or not and how sever a legitimate alarm may be.

The disclosed systems also provide value outside of security threats, informing busy homeowners when teens arrive safe from school, if a nanny is late, or if other home awareness concerns arise. The disclosed apparatuses can be used as a standalone solution or as an addition to existing security systems to reduce false detections and enhance the context of alerts.

Moreover, operation of the disclosed apparatuses causes a reduction in greenhouse gas emissions compared to traditional methods for presence detection. Every year, approximately 40 billion tons of $CO^2$ are emitted around the world. Power consumption by digital technologies including home and business security systems accounts for approximately 4% of this figure. Further, conventional security systems can sometimes exacerbate the causes of climate change. For example, the average U.S. power plant expends approximately 600 grams of carbon dioxide for every kWh generated. The implementations disclosed herein for listening to passive Wi-Fi signals emitted by devices can mitigate climate change by reducing and/or preventing additional greenhouse gas emissions into the atmosphere. For example, the use of passive Wi-Fi signals reduces electrical power consumption and the amount of data transported and stored compared to traditional methods for presence detection that generate and store video data. In particular, by reducing unnecessary alerts and costly false-alarm dispatches, the disclosed systems provide increased efficiency compared to traditional methods.

Moreover, in the U.S., datacenters are responsible for approximately 2% of the country's electricity use, while globally they account for approximately 200 terawatt Hours (TWh). Transferring 1 GB of data can produce approximately 3 kg of $CO^2$. Each GB of data downloaded thus results in approximately 3 kg of $CO^2$ emissions or other greenhouse gas emissions. The storage of 100 GB of data in the cloud every year produces approximately 0.2 tons of $CO^2$ or other greenhouse gas emissions. Avoiding data-intensive video capture and storage using Wi-Fi signaling, cellular signaling, Bluetooth signaling, network discovery, and Wi-Fi fingerprinting instead reduces the amount of data transported and stored, and obviates the need for wasteful $CO^2$ emissions. Therefore, the disclosed implementations for translating raw data to insights at high levels of efficiency mitigates climate change and the effects of climate change by reducing the amount of data stored and downloaded in comparison to conventional technologies.

The description and associated drawings are illustrative examples and are not to be construed as limiting. This disclosure provides certain details for a thorough understanding and enabling description of these examples. One skilled in the relevant technology will understand, however, that the embodiments can be practiced without many of these details. Likewise, one skilled in the relevant technology will understand that the embodiments can include well-known structures or features that are not shown or described in detail, to avoid unnecessarily obscuring the descriptions of examples.

FIG. 1 is a block diagram that illustrates an example system 100 that can implement aspects of the present technology. The system 100 includes electronic devices 104, 108, 112, 116, 124, a user device 140, a computer device 120, a network 128, and a cloud server 132. Likewise, implementations of the example system 100 can include different and/or additional components or be connected in different ways. The system 100 is implemented using components of the example computer system 800 illustrated and described in more detail with reference to FIG. 8.

The system 100 provides a framework for dynamically generating alarm response workflows based on RF signal data received at a premises. The framework uses a trained machine learning model that learns relationships between devices and individuals (e.g., which individual "owns" which device), as well as relationships between legitimate and false alarm notifications (e.g., when is it more likely that an alarm is false vs. real). In some implementations, error metrics are defined to evaluate performance such as a confidence score, accuracy, and/or misclassification rate. The performance of the error metrics may be observed in unseen test datasets (e.g., the second Wi-Fi probe requests described in more detail below). In some examples, an acceptable range is defined for error metrics, e.g., 80-100% accuracy. For example, through testing, if the results of the test datasets return at least an 80% accurate alarm workflow (e.g., the proper dynamic call list based on the devices present among other variables the system evaluates), then that trained model may be used for future inferences. The disclosed methods for intelligently generating a dynamic alarm workflow have applications across different industry segments because they enable accurate detection of known and unknown intruders, as well as efficient workflows that can dispatch law enforcement faster in emergency situations and decrease wasting scarce first responder resources on false alarms. System 100 can be used, for example, for public and private security systems (both residential and commercial) in generating efficient call lists when an alarm is triggered or dispatching law enforcement immediately when certain devices are detected (or absent) at certain times. The systems described herein may also be used to better determine when fire alarms and carob monoxide alarms are false or legitimate. The methodology performed by system 100 is extensible to all wireless data transfer protocols, such as Wi-Fi, Bluetooth, cellular, and other signal transmission protocols.

The system 100 can be used to perform a computer-implemented method for training a machine learning (ML) model, sometimes referred to as an artificial intelligence (AI) model. An example AI model 730 is illustrated and described in more detail with reference to FIG. 7. For example, computer device 120 collects wireless signals emitted by multiple first electronic devices (training electronic devices), for example, electronic devices 104, 108, 112, 116, 124). As shown by FIG. 1, electronic device 104 emits Wi-Fi signal 136. The first electronic devices are used to engineer a feature set and train a machine learning model. Later, in operation, the trained machine learning model is used to detect presence of multiple second electronic devices (described below).

In another example, user device 140 may emit a GPS signal to a satellite. Another user device, such as a smart television, may emit a broadcast signal via a coaxial cable that is connected to an on-premises satellite. Each of these signals may indicate whether a certain device is "on" or "in use" and which individual most likely "owns" the respective device. The signal data may be aggregated and transmitted via network 128 to a cloud server 132 (e.g., a data center) for further processing.

Computer device 120 can be a sensor device, a networking hardware device, a Wi-Fi access point, a smartphone, a laptop, a desktop, or a tablet. Computer device 120 may be a "node" as described earlier. Computer device 120 may or may not be connected to a Wi-Fi network. Computer device 120 includes a Wi-Fi receiver (sometimes referred to as a Wi-Fi receiver circuit) that can receive passive Wi-Fi signals such as Wi-Fi probe requests sent from electronic devices located in proximity to the computer device 120 even when the electronic devices are not connected to a Wi-Fi network that the computer device 120 is connected to. Such probe requests may be used to determine whether an unknown device is present on premises.

Electronic device 104 is a smartphone. Electronic device 108 is a wearable fitness device that is Wi-Fi capable. Electronic device 108 may also be a smart collar for a pet that has GPS signal capability. Electronic device 112 is a wearable device, such as a smartwatch, that is Wi-Fi capable. Electronic device 116 is an Internet of Things (IoT) device, such as a smart printer, that is Wi-Fi capable. The disclosed methods monitor a wide range of wireless protocols and devices, providing insights into the presence and behavior of IoT devices.

Electronic device 124 is a smart device, such as a smart bulb, that is Wi-Fi capable. Electronic devices 104, 108, 112, 116, 120 can have different makes and/or models. User device 140 is a smartphone, tablet, laptop, or desktop capable of communicating with the computer device 120 and/or the cloud server 132. The computer device 120 is connected to the cloud server 132 via network 128, which can be a Wi-Fi network, the Internet, or a cellular network. The network 128 can be implemented using example network 814 illustrated and described in more detail with reference to FIG. 8.

In some implementations, the first transmission signals are collected by receiving respective Wi-Fi or cellular signals at the computing device 120. These signals may be simple WiFi requests (e.g., browsing the Internet) or cellular requests (e.g., making a call over a 4G network). The signal data may indicate (i) the ownership of the device (e.g., which individual is most likely associated with that particular device or if the device is unknown); (ii) the location of the device with respect to the premises (e.g., is the device outside or inside the premises); (iii) the battery life of the device, (iv) whether the device is in use (e.g., is the television "on" or "off"); and/or (v) historical data related to the device (e.g., last time the device was on premises, whether the device is usually "active" during certain hours, etc.). Other metadata may also be intercepted by system 100 that may be relevant to determining a dynamic call list when an alarm is triggered and what priority level to assign to an alarm notification. This signal data may be transmitted via network 128 to cloud server(s) 132 for further processing and analysis by trained AI models.

By passively listening to the broadcasted signals from the various electronic devices, system 100 intercepts, analyzes these signals, and can dynamically generate a call list based on an alarm notification and also set a priority level for a certain alarm notification, even though a particular device may not be directly connected to the local Wi-Fi network. Further, based on the populated metadata fields the system receives, the system may use at least one underlying trained ML model to predictively fill in other metadata fields that may be received as unpopulated (or blank).

Given a snapshot of recent signal activity, information about the unique devices and their associations with certain individuals who reside on premises are extracted. In some implementations, a trained Gradient-Boosting Decision Tree (GBDT) machine learning model is used. The extracted features from the metadata fields are fed into this model and may represent information related to the identity of the device(s) and identity of the owners of those device(s). Other information may relate to the category level of an alarm. In some example aspects, the metadata fields (e.g., connection type, data transfer rate, Wi-Fi connection strength, etc.) may be passed to the GBDT model, and the GBDT model may use these metadata fields to create features that are then reincorporated into the model (i.e., to make the model more accurate).

In some embodiments, when an individual first sets up their security system (e.g., when a new account is created with a security system), the individual may manually associate certain electronic devices with certain individuals and provide system 100 with an initial dataset that has a high level of accuracy. The AI model(s) that may be applied to future on-premises data may require further manual input to become more accurate over time. For example, when unknown devices appear for the first time on premises, the system may prompt the homeowner to identify the device and the device's owner (if known). Over time, the system will be able to rely on a database of known devices to determine whether alarm notifications are more likely legitimate or accidental.

Multiple features are generated (sometimes referred to as feature extraction) from the RF signals. For example, multiple features are extracted for generating a training set for a machine learning model. By analyzing RF data and employing advanced machine learning algorithms, the disclosed methods provide valuable data-driven insights. This data is used to enhance both security and the user experience. Feature engineering (or feature extraction or feature discovery) is the process of extracting features (characteristics, properties, or attributes) from raw data (e.g., Wi-Fi signals, cellular signals). Features and feature vectors are described in more detail with reference to FIG. 7. The feature generation can be performed on the computer device 120. Information describing the first signals can be sent from the computer device 120 to the cloud server 132 after the computer device 120 collects the first RF signals, such that the feature generation is performed on the cloud server 132. The first RF signals may include multiple metadata fields. For example, data values extracted from the metadata fields may indicate radio frequencies and/or data rates supported by the first electronic devices, as well as ownership information related to the device. Such data values can be used as features or portions of a feature vector. In some examples, the RF signal data may be used by the system to accurately predict the number of devices present on premises.

In some implementations, the features indicate a unique data value present in one of the metadata fields during at least one of the timeframes. In some implementations, the features generated indicate data values of multiple metadata fields in at least one of the multiple RF signals. Using the data values in a RF signal associated with a particular frequency channel to train the machine learning model reduces the misclassification error/rate of the machine learning model. In some implementations, the features indicate a mode (most common value) of data values present in one of the metadata fields. The mode may be compared against a confidence threshold to determine whether the misclassification error/rate is low enough for use in the model. Certain confidence intervals may require that an output is 95% accurate in order for the dataset to be incorporated into the model.

The misclassification error/rate may be applied to determining whether a certain individual is an "owner" of a device and/or whether a certain alarm notification should be graded as a level 0, 1, 2, 3, or 4 priority. The RF signal data from the devices on premises may be analyzed in real-time to make such accurate predictions.

The features generated may identify the type of electronic device emitting the RF signals. The system 100 may determine the identity (type, manufacturer, model number, etc.) of at least one electronic device in proximity to the computer device 120. For example, computer device 120 is in a home or business. For example, computer device 120 may be a router or modem (or some other "node"). Computer device 120 may receive a signal, such as a Wi-Fi probe request, from at least one electronic device, such as device 140 (a smartphone). The Wi-Fi probe request from device 140 may include metadata that computer device 120 reads and extracts. The metadata that is transmitted via the Wi-Fi probe request may indicate the type of electronic device that is initiating the probe request based on a trained machine learning model that has analyzed other electronic devices' metadata associated with certain electronic device types. Based on the analyzed metadata from the electronic device (such as smartphone device 140), the computer device 120 that is running the trained machine learning model may identify that device 140 is indeed a smartphone. The machine learning model may also conclude that the smartphone is made by a certain manufacturer and is a certain model. In some implementations, the Wi-Fi probe request may include metadata fields that are blank. The machine learning model may suggest data to populate the blank metadata fields based on the other metadata that was transmitted along with the Wi-Fi probe request. A feature vector based on the data values present in the multiple metadata fields may be generated, wherein the feature vector is indicative of the type of electronic device that is transmitting the Wi-Fi probe request.

Ultimately, the system may determine that the smartphone 140 is an unknown device that has never been physically present on the premises. As such, an alert may be transmitted to the premises owner to identify the device (if known). In other examples, if an alarm is triggered, the fact that an unknown device is on premises may be utilized in dynamically calculating a call list, dispatching law enforcement, and/or determining the priority level of the alarm notification.

A training set generated from the features is stored on a computer system (e.g., cloud server 132) to train a machine learning model to determine a type (i.e., identity) of multiple second electronic devices (similar to the first electronic devices) based on a feature vector extracted from multiple second Wi-Fi probe requests emitted by the second electronic devices. In other embodiments, the features stored on a computer system like cloud server 132 may be used to train a machine learning model to identify the owner(s) of certain devices and which priority level an alarm notification should be assigned. Storing the training set on the computer system can cause a reduction in greenhouse gas emissions compared to traditional home security methods that store training video images captured by cameras in proximity to the first electronic devices. For example, avoiding data-intensive video capture and storage using the Wi-Fi signaling methods disclosed herein reduces the amount of data transported and stored, and reduces $CO^2$ emissions caused by datacenters.

The expected types of electronic devices present, the owners of those devices, and the priority levels of alarm notifications can impact the prediction value of each of the input features at different moments in time. Through training, the ML model learns and analyzes patterns, picks up on the relationships between the features and the number of electronic devices, and can more accurately predict the types of other electronic devices in functional operation based on future observed values of the features. Once system 100 is deployed with the trained model in place, the model can usually identify the types of electronic device transmitting RF signals, such as Wi-Fi probe requests, based on new probe request snapshots and the extracted feature values.

The machine learning model is trained using the generated features with information indicating the makes and/or models of the first electronic devices, the owners of the electronic devices, and default priority levels of alarm notifications. In some examples, the features are combined with information indicating the makes and/or models of the first electronic devices and the owners of those electronic devices into a training set to train the machine learning model. The information indicating the makes and/or models can be used as a training and/or validation training set or as expected results for the machine learning model. In some examples, the training set may be used to fit a model, and the validation set may be a hold-out set that is independent of the training set. The validation set may be used to verify and/or validate the model. A third set, a test set, may be used to combat model overfit, in some circumstances. AI and ML training methods are described in more detail with reference to FIG. 7.

In some examples, the AI models may be trained on data that indicates which priority level an alarm notification should receive. For example, an alarm notification that goes off simultaneously with (i) the homeowner arriving to the premises, (ii) at 6 pm in the evening, and (iii) the garage door was just closed, may be associated with a 90% false alarm rate and a 10% legitimate rate. In another example, an alarm notification that goes off at 3 am in the early morning when only a teenage resident is present on premises may be associated with an 80% legitimate rate and a 20% false rate. These confidence rankings may be applied to numerous alarm scenarios and variables. The rankings and various scenarios (and variables) may be initially manually input to AI models for training. The AI models may use this training data to more accurately determine which priority level a future alarm notification should receive.

The machine learning model(s) described herein may be trained to determine presence of and types of electronic devices in proximity to a computer device (e.g., computer device 120, a node) based on a feature vector extracted at least one RF signal emitted from at least one of the electronic devices. Example AI and ML operation using a trained model is illustrated and described in more detail with reference to FIG. 7. In some implementations, the machine learning model is trained using the training set to detect a difference between two electronic devices having a same make and/or model (e.g., whether a certain smartphone model has 64 GB or 256 GB storage) and/or the difference between two alarm notifications that occur at the same time but with different on-premises devices detected (e.g., whether an alarm priority level should be set to level 0 or level 2).

While initial device signals and manual data input are used to train the ML model, the trained ML model is used to later detect the presence of and identify the types of the unknown electronic devices (i.e., devices that are not initially part of an account setup process). The trained ML model may also be used to later determine which priority level an alarm notification should be set to, with the objective of calculating a dynamic call list that most efficiently leads to determining with 100% accuracy whether an alarm is legitimate or false. The future RF signals from electronic devices may be received by any node in the network communicably coupled to a computer system (e.g., computer device 120 or the cloud server 132). Thus, identifying the type(s) of the future unknown electronic devices can be performed on computer device 120 or the cloud server 132. The trained machine learning model is stored on the computer system (e.g., computer device 120 or the cloud server 132) to determine the presence and types of the unknown electronic devices in proximity to a node on premises, such as the computer device 120.

In some implementations, the machine learning model is a gradient-boosting decision tree. A gradient-boosting decision tree can be used for solving prediction problems in both classification and regression domains. The gradient-boosting decision tree approach improves the learning process by simplifying the objective and reducing the number of iterations to get to a sufficiently optimal solution.

Figure 2A:
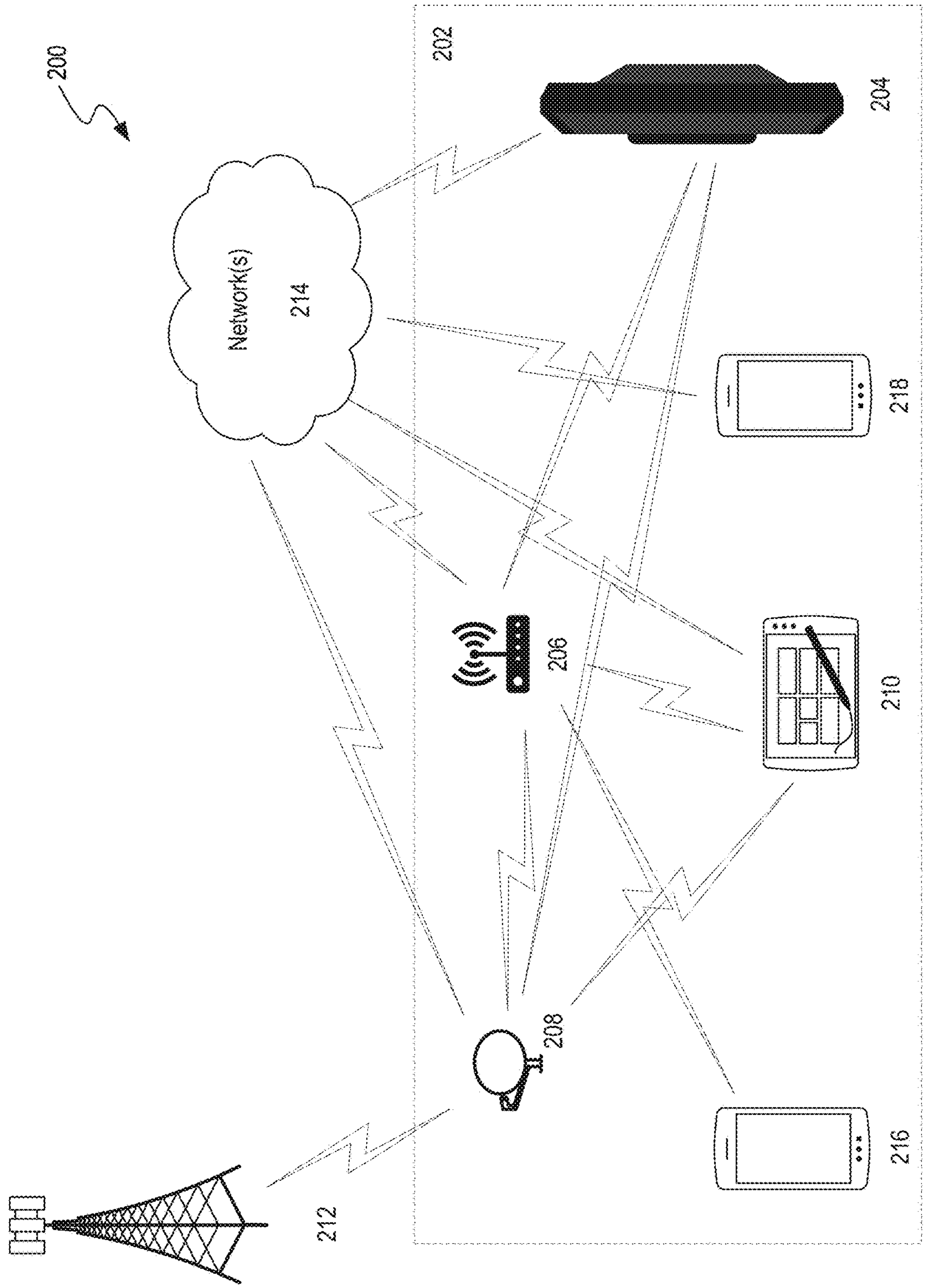
FIG. 2A is a drawing that illustrates an example premises with multiple devices present and connected to various networks.

FIG. 2A is a drawing that illustrates an example premises with multiple devices present and connected to various networks. In environment 200, the premises 202 may represent personal property or a business property. Premises 202 may have a local network 214 and a nearby cell tower 212. Network 214 and cell tower 212 may receive RF signals from various devices around the premises 202.

Inside premises 202 may include a satellite 208 and a Wi-Fi router 206. These devices may be considered nodes within the broader network 214. Satellite 208 may receive immediate RF signals from various devices, such as tablet 210 and smart television 204. Wi-Fi router 206 may also receive various RF signals from smartphones 216 and 218, tablet 210, and smart television 204. Each of these signals may contain information that shows whether a certain device is active or inactive, how long a device has been "on" or "off," the approximate geographical location of that device, and the identity of the owner of the device(s), if that information is known by the system at the time the signals are processed.

In environment 200 in FIG. 2A, if an alarm is triggered, the priority level that the system may assign is level 0 or "low" because, e.g., each of the electronic devices are known devices in the network, the time is 2:30 pm in the afternoon, the smart television 204 is "on," and a pet with a smart collar is detected to have just exited the back door of the premises 202 (i.e., the AI model may assume that a known individual on premises opened the back door before disarming the alarm system to let the pet outside, thereby causing the alarm to go off). In this example environment 200, the alarm priority may initially be set to "level 0."

The monitoring center may receive this alarm notification along with a dynamic call list that is based on the presence of certain individuals at the premises. In this example scenario, several known individuals are on premises, including the homeowner. The dynamic call list provided to the monitoring center may start with the account owner/homeowner then the spouse (who is also on premises), then the teenage child (also on premises), and then neighbor #1 (also on premises).

Figure 2B:
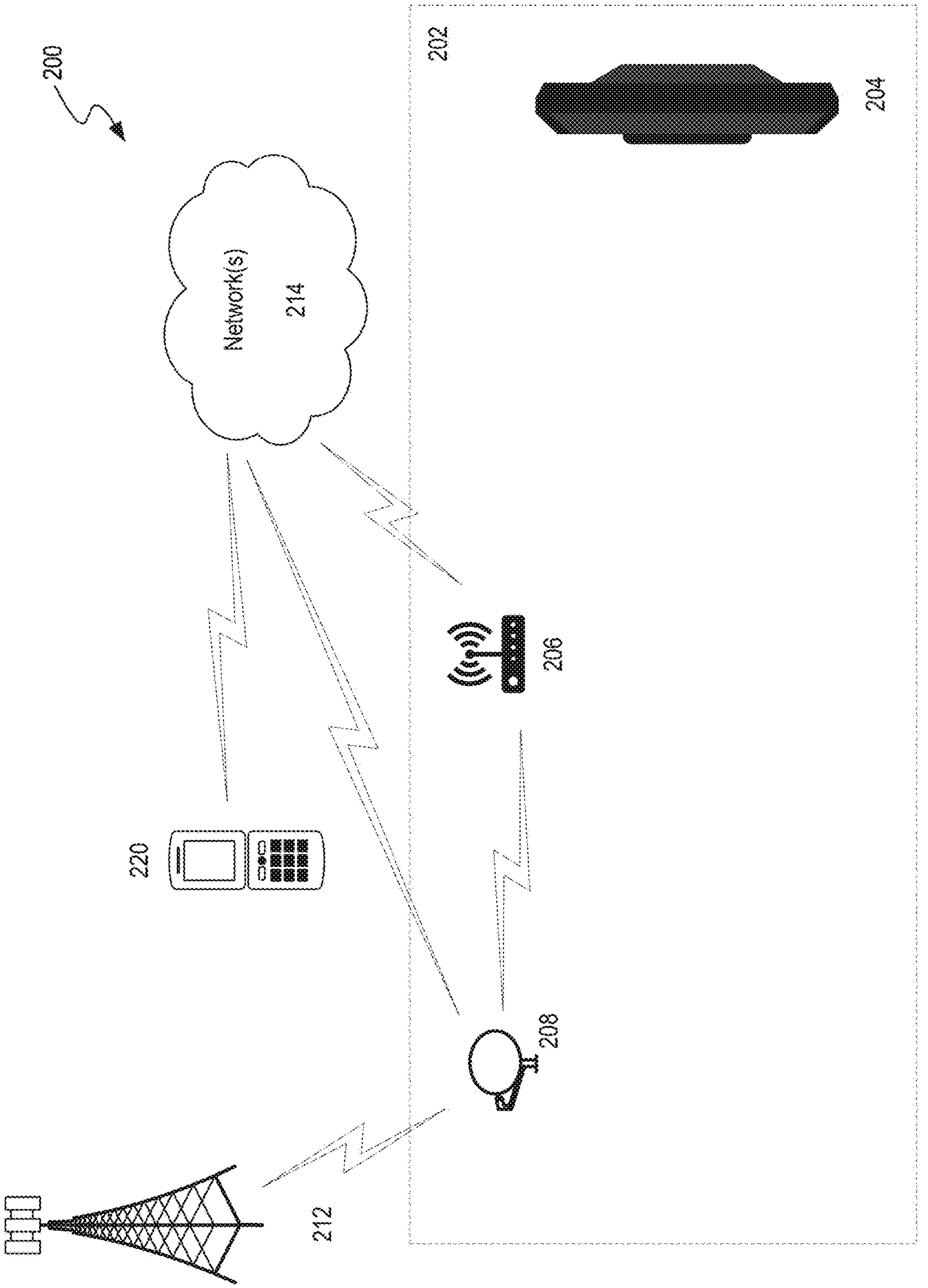
FIG. 2B is a drawing that illustrates an example premises with fewer devices present than FIG. 2A with an anomalous device present outside the premises.

FIG. 2B is a drawing that illustrates an example premises with fewer devices present than FIG. 2A with an anomalous device present outside the premises. In this example, unknown device 220 emits a low-frequency Wi-Fi probe request that is picked up by network 214 and transmitted over the network nodes to a cloud server/data center for processing. This signal is picked up by the system. Following this signal reception from unknown device 220 nearby the premises 202, the system may receive an alarm notification. Following this alarm notification, the unknown device 220 may be broadcasting an updated location inside the premises 202 instead of outside the premises. In this example, because no other known personal devices are on premises, the smart television 204 is "off," and the time is 3 am in the morning, the alarm priority may be set to level 2 or level 3. The ML model may infer that an unknown intruder has entered the home.

The system may then transmit this information to the alarm monitoring center along with a dynamic call list. In this example, the system may know that the homeowner/main account owner is out of town on a work trip, so she is far away from the premises. Thus, she is deprioritized in the dynamic call list. The system may know that both neighbor #1 and neighbor #2 are home, however. Thus, the dynamic call list may prioritize calling both of those neighbors first to assess the situation of the premises next door before escalating the alarm to law enforcement. If, for example, both neighbors do not answer, the system may automatically dispatch law enforcement to the premises with the information that no known individuals are home and that an unknown device is on premises.

In another scenario, a single known device may be on premises (e.g., a babysitter with her smartphone). If an alarm is triggered, the dynamic call list that is generated may prioritize calling the babysitter first before the homeowner. If the babysitter does not answer, law enforcement may be dispatched with the knowledge that a known individual (the babysitter) is most likely at the residence. This latter information may be critical for avoiding an accidental confrontation. In many false alarm situations, law enforcement may mistake the homeowners as intruders and confront the homeowners aggressively. To avoid this confrontation (and subsequent bodily injury), law enforcement may receive intelligent information from the system (or monitoring center) that a known party—specifically the babysitter—is on premises.

In yet another scenario, an alarm notification is received by the system. An unknown device is detected on premises, and the activity of a known device on premises (e.g., a gaming console) ceases after being active for the previous three hours. The gaming console device is associated with a teenage resident of the premises. If no other personal devices of the homeowners are detected on premises, then they system may assume that the teenage child (minor) is on premises alone with an unknown intruder. Because the gaming console activity stopped after the alarm was triggered, the system may immediately escalate the alarm notification to level 4 and dispatch law enforcement. This escalation may occur before or after transmitting this information to the monitoring center. In other words, the system described herein is equipped to directly notify law enforcement of the pending threat without involving the monitoring center.

In yet another example, the system may detect a Wi-Fi probe request from an unknown device and then detect an abnormal power outage for the premises. The system may cross-check known power utility databases to ascertain whether the power outage is a neighborhood-wide or city-wide power outage or limited to the premises. If the power outage is limited to the premises, the system may be trained to assume that such a data point is more likely associated with a nefarious actor (e.g., intentionally cutting the power to a premises) as opposed to a legitimate power outage. The system may interpret these signals as a possible intruder tampering with power and communications on the premises and may immediately notify law enforcement. Such a notification may occur even if the alarm has not yet been triggered or if the alarm has been deactivated (due to the power outage).

In a variation of the last scenario described, another variable the system may be able to analyze is the current weather. In geographic areas with stormy weather, the weather may be the reason why certain power outages are limited to a single premises (e.g., a tree falling on a power line going to the premises).

Other variables that may be analyzed by the system to determine the dynamic call list and the priority level of the alarm include but are not limited to: legal proceedings (e.g., whether an individual has a temporary restraining order associated with a premises), whether minors are present on premises (e.g., automatically higher priority alarm level when kids are involved), and video footage from on premises cameras (e.g., if a homeowner gives the system access to real-time video footage of all cameras, the system may be able to quickly analyze the video footage to determine if an alarm is legitimate or false). Regarding this last form of data from the on-premises video cameras, an example scenario may be where a certain motion sensor is triggered in the premises. The system may be able to access the nearest video camera to that motion sensor and see that a small rodent triggered the motion sensor and not a human intruder. The system may then provide this information to both the account owner (e.g., via a mobile application) and/or the monitoring center. The suggested level of the alarm may be assigned as "level 0," despite the alarm being triggered with a single person on premises and occurring at 2:30 am in the morning. The system may have a very high confidence threshold based on the data it received from the video camera that a legitimate threat is not present on premises.

Other example scenarios exist with respect to fire alarms and carbon monoxide alarms. For example, a fire alarm may be triggered at 6:30 pm, which is often a dinner time for a premises. The system may assume that the fire alarm is an accident because the person cooking forgot to turn on the range hood fan or open a window to let the smoke out. As such, the level of the alarm may be set to "level 0" or "level 1," depending on the other data received by the system, such as video footage or other IoT device data (e.g., how many devices are present on premises).

In another example, a carbon monoxide alarm may be triggered. Due to the severity of carbon monoxide alarms, the default level may be "level 4" and immediate dispatch of first responders to the premises. However, if the alarm is triggered during the day and no known personal devices are present on premises, the level may be demoted to "level 3." If personal devices belonging to minors are home and a game console is "on," then the priority level may remain at "level 4" and first responders dispatched because the system may assume the minors have gaming headphones on and may not be aware of the carbon monoxide alarm going off.

In another example, the system may know when the carbon monoxide alarm was last installed and therefore predict a "lifespan" of the carbon monoxide alarm. If an alarm is triggered and the lifespan of the alarm that was triggered has expired, then the system may relay this information to the first responders and the account owner. Rather than a legitimate carbon monoxide threat, the alarm could be an indication that the batteries are dying or that the monitoring device needs to be fully replaced. Other IoT devices today may have real-time carbon monoxide readings. Such readings may also be transmitted to the system to determine the severity of the alarm. If, for instance, a device shows a positive reading of carbon monoxide, the system may automatically dispatch first responders along with the information that positive carbon monoxide is present on premises.

In another example situation where an unknown device is detected initially and the alarm is then disarmed while the unknown device remains on premises, the system may determine that a hostage situation is likely (e.g., an unknown intruder forces a resident to disarm the alarm system by threat of force). Despite the alarm cancel notification being received in a short amount of time, the presence of the unknown intruder may still trigger a workflow that prompts a monitoring center (e.g., such as monitoring center 306 from FIG. 3) to reach out to the account owner to determine whether everything is "OK" on premises. No response by account owner may cause the system (or monitoring center) to dispatch law enforcement. In current security system setups, most monitoring centers would not call the account owner if a cancel signal is received in a short amount of time. Because the monitoring center has no visibility into the presence of the unknown device on premises, the monitoring center has no reason to believe that a possible hostage situation is underway on premises.

Other applications of the system described herein may apply to insurance. For example, home insurers can offer services to check-in on a residence if a long-term vacancy is detected. Long term vacancies may be associated with higher chances of property damage and therefore a higher likelihood of insurance payouts. The system described herein could alert the homeowner (or another individual in proximity to the residence) to check-in on the premises after a certain amount of vacancy time. Alternatively, insurance policies may allow the insurance company to send a representative to check-in on the premises if the homeowner or another trusted individual is unavailable to inspect the premises. Such an application could be implemented by property insurers, and policy holders may receive a premium discount if they agree to this vacancy monitoring system.

Figure 3:
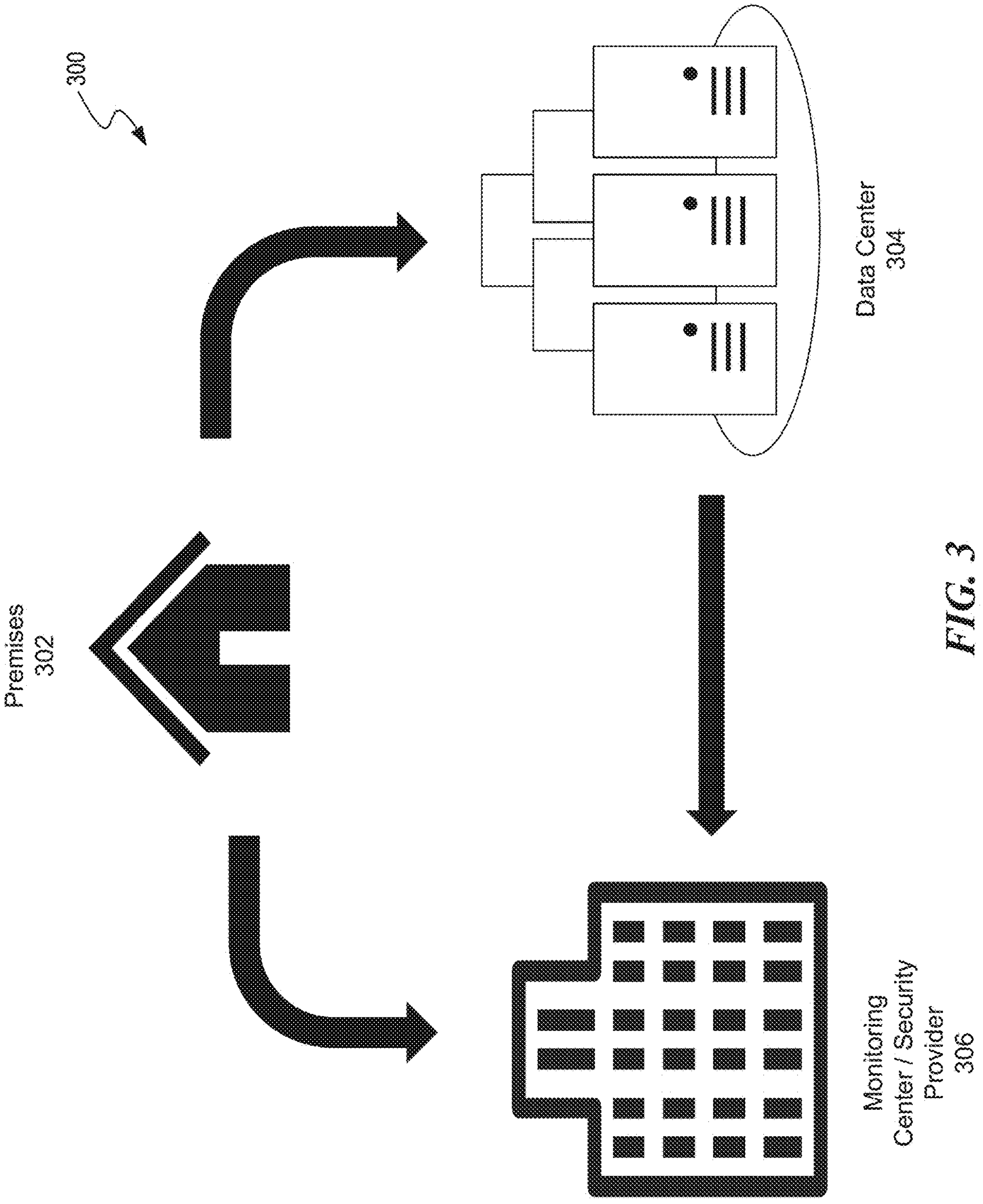
FIG. 3 is an example environment illustrating the flow of data among a premises, data center, and monitoring center/security provider.

FIG. 3 is an example environment illustrating the flow of data among a premises, data center, and monitoring center/security provider. The environment 300 shows the typical data flow between the premises 302, the data center 304 (e.g., cloud server(s) 132), and the monitoring center/security provider 306. In each of the example scenarios described with respect to FIGS. 2A and 2B, the IoT devices that are present may provide information to the data center 304 and/or monitoring center 306. The data, which may comprise various RF signals associated with known and unknown devices associated with known and unknown individuals, may be analyzed at data center 304. Data center 304 may house at least one trained AI model that is trained on previous data related to known devices on the premises 302, as well as various alarm priority scenarios that allow the AI model(s) to determine an accurate priority level of an alarm notification.

Data center 304 may be responsible for determining a dynamic call list and the priority level of an alarm notification. Based on the input information received by data center 304, a dynamic call list may be generated and shared with monitoring center 306. Similarly, based on the input information received by data center 304, a priority level for the alarm notification may be assigned and transmitted to monitoring center 306. Various input data and preliminary conclusions based on the input data generated at data center 304 may also be provided to monitoring center 306 for added context. Monitoring center 306 may provide this information to law enforcement if/when monitoring center 306 determines law enforcement dispatch is necessary. In other examples, data center 304 may transmit the information and preliminary conclusions directly to law enforcement.

Figure 4:
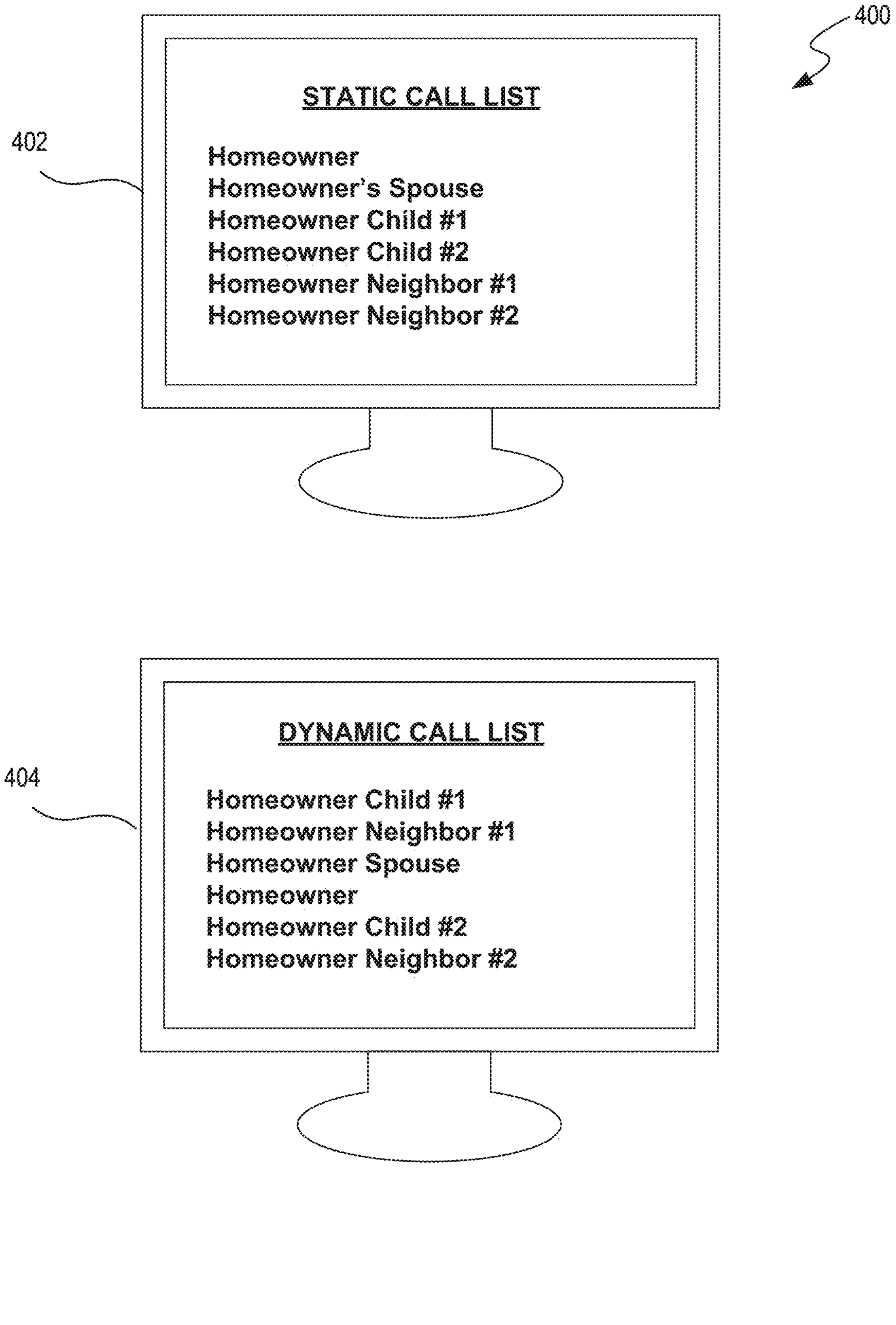
FIG. 4 is a drawing that illustrates two different user interface examples of a static call list and a dynamic call list.

FIG. 4 is a drawing that illustrates two different user interface examples of a static call list and a dynamic call list. In environment 400, two different call lists are presented: static call list 402 and dynamic call list 404. As described herein, the system is equipped to analyze various RF signal data in conjunction with trained AI model(s) to determine the most efficient call list to provide to a monitoring center. This call list is dynamically created to allow the monitoring center to ascertain as quickly as possible whether a legitimate threat exists to the premises or not.

In this example, static call list may be the default list a homeowner (account owner) provides to the monitoring center upon account setup. The list may include homeowner, homeowner's spouse, homeowner's children, and homeowner's neighbors. However, based on the ever-changing lives and living situations of residents on the premises, this static call list may not be optimal to determine if an alarm indicates a real threat or is a false alarm. For example, if the homeowner and his family were on vacation, the monitoring center would be unable to get ahold of any person on or nearby the premises until the $5^{th}$ or $6^{th}$ call to the neighbors. Nearly 5 minutes or more time has passed by the time the monitoring center may be able to contact those neighbors based on following the static call list.

Under the dynamic call list, however, the system may have received information from one of homeowner's children's devices indicating that the child #1 is on premises. Thus, the dynamic call list will prioritize calling child #1 on premises to see if a real threat is occurring or if child #1 accidentally set the alarm off (false alarm). If no response is received form child #1, the system knows that no other known device is on premises, so the system may suggest dispatching law enforcement at that moment. Alternatively or simultaneously, the system may then prioritize calling neighbor #1 who is home and ask that neighbor to check in on the next door premises. After that, the system may have noticed that homeowner's spouse was last seen at the premises about 1 hour ago, so the system may intelligently assume the spouse is within a short driving distance of the premises, so the system may call the spouse and alert the spouse of the alarm notification. In short, the dynamic call list allows the monitoring center to determine whether an alarm notification is false or not quickly and efficiently and also preserves law enforcement/first responder resources in false alarm situations.

Figure 5:
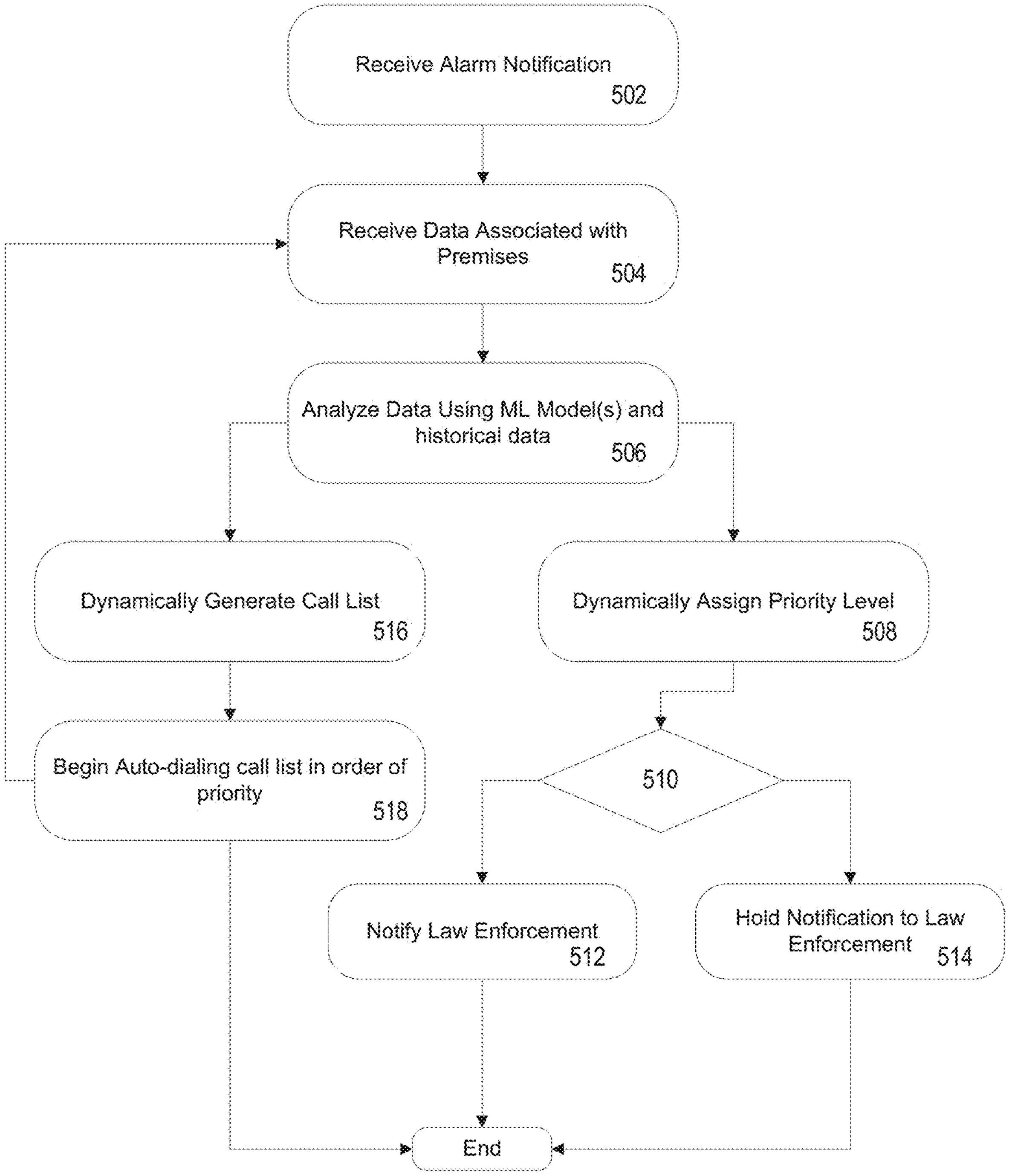
FIG. 5 is a flow diagram that illustrates an example process for dynamically generating a workflow related to the triggering of an alarm.

FIG. 5 is a flow diagram that illustrates an example process for dynamically generating a workflow related to the triggering of an alarm. Process 500 begins with step 502, receive alarm notification. The system may receive an alarm notification initially, and based on the alarm notification, the system may then receive data associated with the premises on which the alarm is located at step 504. In some examples, the system may be passively receiving this data prior to an alarm being triggered, so the system is constantly assessing the incoming real-time data of the premises to determine whether a threat is present. For instance, the system may first detect an unknown device via a low-frequency Wi-Fi probe request on premises prior to an alarm being triggered.

However, once an alarm is triggered, the system may use the previously received unknown device signal to increase the priority of the alarm notification.

After the alarm notification and premises data is received by the system, the system may apply at least one trained ML model(s) to the data at step 506. Other historical data may be relied upon at step 506 to ascertain both the optimal call list to generate for the monitoring center as well as an appropriate priority level to assign to the alarm.

After the data is processed using the ML model(s) at step 506, both a dynamic call list and a priority level for the alarm are generated. The dynamic call list is generated at step 516, and the priority level for the alarm is dynamically assigned at step 508. Taking the path of step 508 first, after the alarm is assigned an appropriate priority level by the system, the system then reaches decision diamond 510. At decision diamond 510, the system must decide whether the assigned priority level and the other processed data from the ML model(s) warrants immediate escalation to law enforcement or not. As described in previous examples, if certain variables are present in the on-premises data from step 504, the alarm priority level may be adjusted. One variable that may be assessed at decision diamond 510 is whether any known personal devices are on premises (whether the house is occupied or empty). If a premises is empty, then the priority level cannot be set to “level 4,” since no threat to human life exists on premises. This information may be transmitted to law enforcement but it may cause the system to suggest holding a notification to law enforcement at step 514 until, e.g., a dynamic call list has been called through from the monitoring center. In another example, the on-premises information 504 may indicate that the alarm was triggered during a low-threat time of day, such as mid-morning. However, the on-premises data may show that a minor is the only known resident on premises, and an unknown device is also present, and the unknown device is associated with an individual that has a temporary restraining order associated with the property. The system may decide to notify law enforcement at step 512 in such a situation.

Along path 516, a dynamic call list is generated based on the on-premises data, mainly the RF signals received by devices that show known individuals present on premises or most recently present on the premises (e.g., an individual who departed the premises only 30 minutes ago). The system may compute a recency calculation whereby the system ranks the individuals who were at the premises based on the last time they were at the premises. Individuals who were last seen at the premises may rank higher in priority than individuals who have been absent from the premises for a longer period of time. Based on the analysis from the ML model(s) in step 506, a dynamic call list is generated at step 516. This dynamic call list may be shared with a monitoring center, and the call list may be auto-dialed at step 518 either by the system itself or a monitoring center.

Although the notion of the system and the monitoring center are commonly associated with two discrete entities, in some examples, the system may comprise the monitoring center. In other words, the system may also act as the security system’s monitoring center so that the system not only processes the on-premises data to generate a dynamic call list, but the system also makes auto-dials to those individuals via, e.g., an AI-based call center system.

When a call is connected, the background noise and conversation from the call may also be received by the system as input data (step 504). As this new data is received by the system at step 504, the ML model(s) may process this data and update the priority level of the alarm at step 508 and/or update the dynamic call list at step 516. For instance, if glass shattering in the background of a call at step 518 is detected by the system, then that background noise may be received at step 504 and processed at step 506, and the priority level of the alarm may be escalated at 508 from “level 2” to “level 3.”

Figure 6:
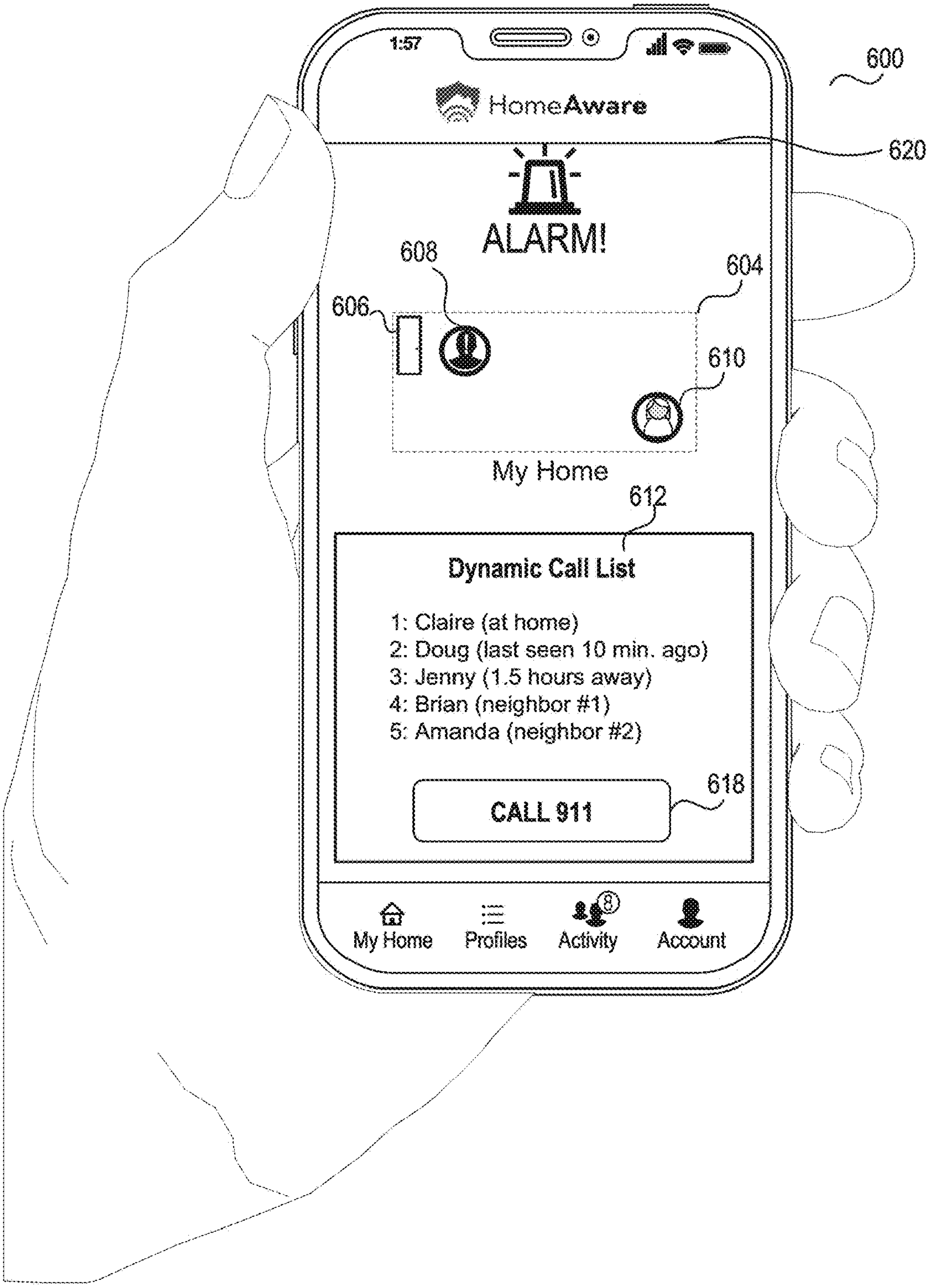
FIG. 6 is a drawing that illustrates a software application operating on a user device.

FIG. 6 is a drawing that illustrates a software application operating on a user device. Device 600 shows software application 620 HomeAware®, which may show an account owner a dynamic call list 612 based on an alarm notification. Throughout this application the examples have focused on providing a monitoring center a dynamic call list. In some examples, however, the dynamic call list may be provided directly to an account owner, e.g., if the account owner is not on premises.

In app 620, the account owner’s premises 604 may be displayed showing an entrance 606 and the locations of individuals on the premises. In this example illustrated in FIG. 6, an unknown device 608 is inside the premises by the entrance 606. Also in the premises is a known personal device 610. The system may receive this on-premises data, apply at least one trained ML model(s) to the data, and generate a dynamic call list and priority level for an alarm. Here, the dynamic call list 612 is presented in the app 620 and shows “Claire (at home)” as the first suggested call. Claire may be associated with device 610 and hence, the “at home” designation next to her name as the first caller in the dynamic call list. Next on the call list is Doug who was “last seen 10 min. ago” on the premises. Doug is likely nearby and can probably come back to the premises relatively quickly, perhaps faster than law enforcement if they were dispatched. At any moment in time, account owner may hit “Call 911” button 618 and dispatch law enforcement.

FIG. 6 illustrates that each of the process steps in FIG. 5 may be applied on mobile device 600. Rather than the monitoring center receiving the alarm notification and on-premises data, the mobile device may receive that data. The mobile device 600 may then analyze and process the data on the mobile device itself, or the mobile device may receive the processed ML data from a data center/cloud server(s).

Figure 7:
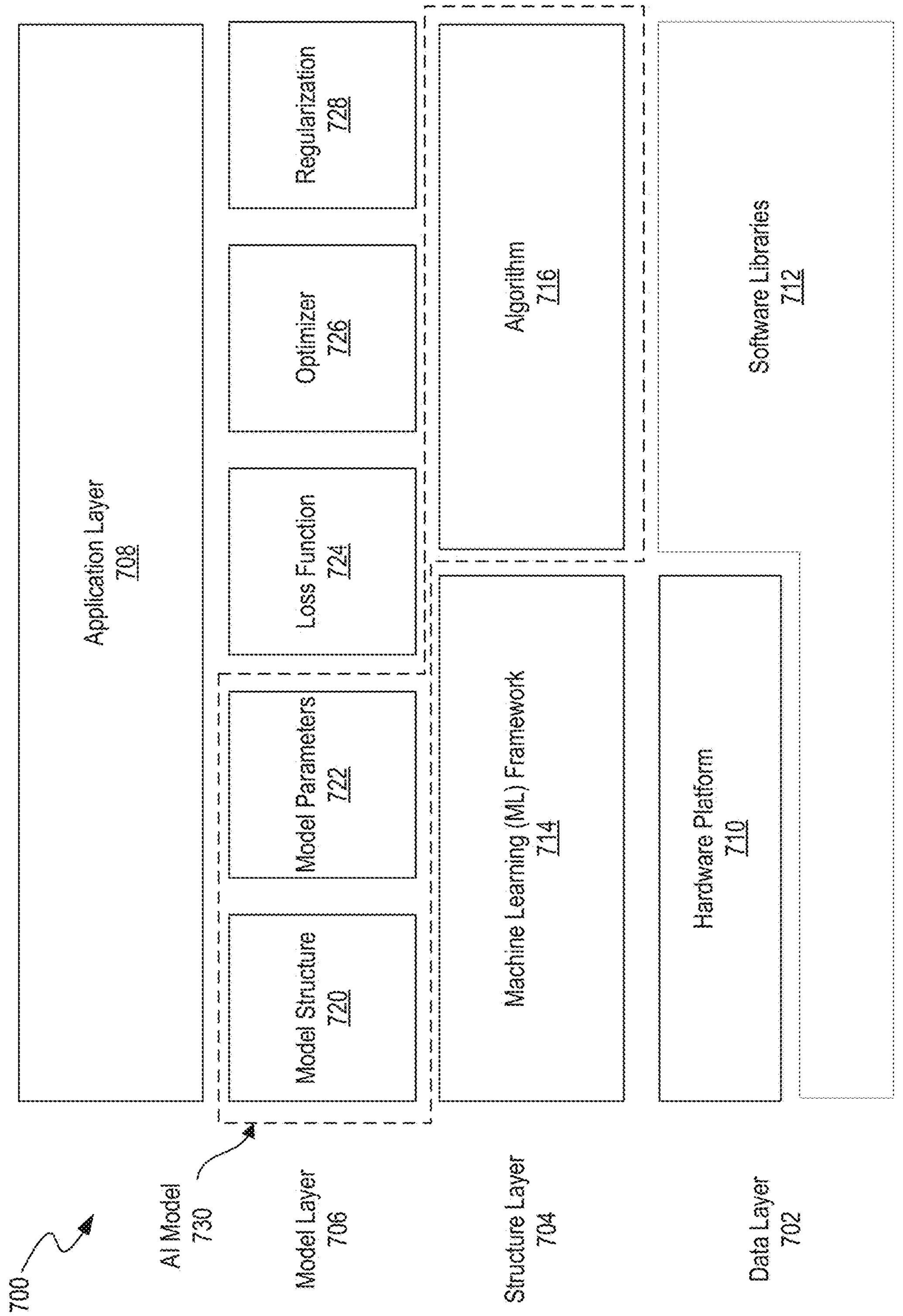
FIG. 7 is a block diagram that illustrates an example artificial intelligence (AI) system that can implement aspects of the present technology.

FIG. 7 is a block diagram that illustrates an example artificial intelligence (AI) system 700 that can implement aspects of the present technology. The AI system 700 is implemented using components of the example computer system 800 illustrated and described in more detail with reference to FIG. 8. For example, the AI system 700 can be implemented using the processor 802 and instructions 808 programmed in the memory 806 illustrated and described in more detail with reference to FIG. 8. Likewise, implementations of the AI system 700 can include different and/or additional components or be connected in different ways.

As shown, the AI system 700 can include a set of layers, which conceptually organize elements within an example network topology for the AI system’s architecture to implement a particular AI model 730. Generally, an AI model 730 is a computer-executable program implemented by the AI system 700 that analyzes data to make predictions. Information can pass through each layer of the AI system 700 to generate outputs for the AI model 730. The layers can include a data layer 702, a structure layer 704, a model layer 706, and an application layer 708. The algorithm 716 of the structure layer 704 and the model structure 720 and model parameters 722 of the model layer 706 together form the example AI model 730. The optimizer 726, loss function engine 724, and regularization engine 728 work to refine and optimize the AI model 730, and the data layer 702 provides resources and support for application of the AI model 730 by the application layer 708.

The data layer 702 acts as the foundation of the AI system 700 by preparing data for the AI model 730. As shown, the data layer 702 can include two sub-layers: a hardware platform 710 and one or more software libraries 712. The hardware platform 710 can be designed to perform operations for the AI model 730 and include computing resources for storage, memory, logic and networking, such as the resources described in relation to FIG. 8. The hardware platform 710 can process amounts of data using one or more servers. The servers can perform backend operations such as matrix calculations, parallel calculations, machine learning (ML) training, and the like. Examples of servers used by the hardware platform 710 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 710 can include Infrastructure as a Service (IaaS) resources, which are computing resources, (e.g., servers, memory, etc.) offered by a cloud services provider. The hardware platform 710 can also include computer memory for storing data about the AI model 730, application of the AI model 730, and training data for the AI model 730. The computer memory can be a form of random-access memory (RAM), such as dynamic RAM, static RAM, and non-volatile RAM.

The software libraries 712 are suites of data and programming code, including executables, used to control the computing resources of the hardware platform 710. The programming code can include low-level primitives (e.g., fundamental language elements) that form the foundation of one or more low-level programming languages, such that servers of the hardware platform 710 can use the low-level primitives to carry out specific operations. The low-level programming languages do not require much, if any, abstraction from a computing resource's instruction set architecture, allowing them to run quickly with a small memory footprint. Examples of software libraries 712 that can be included in the AI system 700 include Intel Math Kernel Library, Nvidia cuDNN, Eigen, and Open BLAS.

The structure layer 704 can include a machine learning (ML) framework 714 and an algorithm 716. The ML framework 714 can be thought of as an interface, library, or tool that allows users to build and deploy the AI model 730. The ML framework 714 can include an open-source library, an application programming interface (API), a gradient-boosting library, an ensemble method, and/or a deep learning toolkit that work with the layers of the AI system facilitate development of the AI model 730. For example, the ML framework 714 can distribute processes for application or training of the AI model 730 across multiple resources in the hardware platform 710. The ML framework 714 can also include a set of pre-built components that have the functionality to implement and train the AI model 730 and allow users to use pre-built functions and classes to construct and train the AI model 730. Thus, the ML framework 714 can be used to facilitate data engineering, development, hyperparameter tuning, testing, and training for the AI model 730.

Examples of ML frameworks 714 or libraries that can be used in the AI system 700 include TensorFlow, PyTorch, Scikit-Learn, Keras, and Cafffe. Random Forest is a machine learning algorithm that can be used within the ML frameworks 714. LightGBM is a gradient boosting framework/algorithm (an ML technique) that can be used. Other techniques/algorithms that can be used are XGBoost, CatBoost, etc. Amazon Web Services™ is a cloud service provider that offers various machine learning services and tools (e.g., Sage Maker) that can be used for platform building, training, and deploying ML models. In other examples, the machine learning model(s) disclosed herein may rely on a variety of classification algorithms, such as regression based (e.g., logistic regression), tree based (e.g., decision tree, random forest classifiers, gradient boosted decision trees, etc.), clustering techniques (e.g., kNN, K-means, etc.), and/or neural network architectures (MLP, CNN, etc.). In other examples, the machine learning model(s) may rely on a combination of one or more of the aforementioned classification algorithms.

The algorithm 716 can be an organized set of computer-executable operations used to generate output data from a set of input data and can be described using pseudocode. The algorithm 716 can include complex code that allows the computing resources to learn from new input data and create new/modified outputs based on what was learned. In some implementations, the algorithm 716 can build the AI model 730 through being trained while running computing resources of the hardware platform 710. This training allows the algorithm 716 to make predictions or decisions without being explicitly programmed to do so. Once trained, the algorithm 716 can run at the computing resources as part of the AI model 730 to make predictions or decisions, improve computing resource performance, or perform tasks. The algorithm 716 can be trained using supervised learning, unsupervised learning, semi-supervised learning, and/or reinforcement learning.

Using supervised learning, the algorithm 716 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. In an example implementation, training data can include Wi-Fi probe requests or formatted features generated from Wi-Fi probe requests. The user may label the training data based on one or more classes and trains the AI model 730 by inputting the training data to the algorithm 716. The algorithm determines how to label the new data based on the labeled training data. The user can facilitate collection, labeling, and/or input via the ML framework 714. In some instances, the user may convert the training data to a set of feature vectors for input to the algorithm 716. Once trained, the user can test the algorithm 716 on new data to determine if the algorithm 716 is predicting accurate labels for the new data. For example, the user can use cross-validation methods to test the accuracy of the algorithm 716 and retrain the algorithm 716 on new training data if the results of the cross-validation are below an accuracy threshold.

Supervised learning can involve classification and/or regression. Classification techniques involve teaching the algorithm 716 to identify a category of new observations based on training data and are used when input data for the algorithm 716 is discrete. Said differently, when learning through classification techniques, the algorithm 716 receives training data labeled with categories (e.g., classes) and determines how features observed in the training data (e.g., a unique combination of the data values present in at least two of the metadata fields) relate to the categories (e.g., different makes and/or models). Once trained, the algorithm 716 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 716 is continuous. Regression techniques can be used to train the algorithm 716 to predict or forecast relationships between variables. A logistic regression is a type of classification algorithm. To train the algorithm 716 using regression techniques, a user can select a regression method for estimating the parameters of the model. The user collects and labels training data that is input to the algorithm 716 such that the algorithm 716 is trained to understand the relationship between data features and the dependent variable(s). Once trained, the algorithm 716 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations.

Under unsupervised learning, the algorithm 716 learns patterns from unlabeled training data. In particular, the algorithm 716 is trained to learn hidden patterns and insights of input data, which can be used for data exploration or for generating new data. Here, the algorithm 716 does not have a predefined output, unlike the labels output when the algorithm 716 is trained using supervised learning. Said another way, unsupervised learning is used to train the algorithm 716 to find an underlying structure of a set of data, group the data according to similarities, and represent that set of data in a compressed format. The systems disclosed herein can use unsupervised learning to identify patterns in data received from the network (e.g., to identify particular makes and/or models of electronic devices) and so forth. In some implementations, performance of an ML model that can use unsupervised learning is improved because the ML model learns relationships between real-time Wi-Fi probe request broadcast behavior and a number of electronic devices present, as described herein.

A few techniques can be used in unsupervised learning: clustering, anomaly detection, and techniques for learning latent variable models. Clustering techniques involve grouping data into different clusters that include similar data, such that other clusters contain dissimilar data. For example, during clustering, data with possible similarities remain in a group that has less or no similarities to another group. Examples of clustering techniques density-based methods, hierarchical based methods, partitioning methods, and grid-based methods. In one example, the algorithm 716 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 716 may be trained to be an Isolation Forest, local outlier factor (LOF) algorithm, or K-nearest neighbor (k-NN) algorithm. Latent variable techniques involve relating observable variables to a set of latent variables. These techniques assume that the observable variables are the result of an individual's position on the latent variables and that the observable variables have nothing in common after controlling for the latent variables. Examples of latent variable techniques that may be used by the algorithm 716 include factor analysis, item response theory, latent profile analysis, and latent class analysis.

The model layer 706 implements the AI model 730 using data from the data layer and the algorithm 716 and ML framework 714 from the structure layer 704, thus enabling decision-making capabilities of the AI system 700. The model layer 706 includes a model structure 720, model parameters 722, a loss function engine 724, an optimizer 726, and a regularization engine 728.

The model structure 720 describes the architecture of the AI model 730 of the AI system 700. The model structure 720 defines the complexity of the pattern/relationship that the AI model 730 expresses. Examples of structures that can be used as the model structure 720 include decision trees, support vector machines, regression analyses, Bayesian networks, Gaussian processes, genetic algorithms, and artificial neural networks (or, simply, neural networks). The model structure 720 can include a number of structure layers, a number of nodes (or neurons) at each structure layer, and activation functions of each node. Each node's activation function defines how to node converts data received to data output. The structure layers may include an input layer of nodes that receive input data, an output layer of nodes that produce output data. The model structure 720 may include one or more hidden layers of nodes between the input and output layers. The model structure 720 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 722 represent the relationships learned during training and can be used to make predictions and decisions based on input data. The model parameters 722 can weight and bias the nodes and connections of the model structure 720. For instance, when the model structure 720 is a neural network, the model parameters 722 can weight and bias the nodes in each layer of the neural networks, such that the weights determine the strength of the nodes and the biases determine the thresholds for the activation functions of each node. The model parameters 722, in conjunction with the activation functions of the nodes, determine how input data is transformed into desired outputs. The model parameters 722 can be determined and/or altered during training of the algorithm 716.

The loss function engine 724 can determine a loss function, which is a metric used to evaluate the AI model's 730 performance during training. For instance, the loss function engine 724 can measure the difference between a predicted output of the AI model 730 and the actual output of the AI model 730 and is used to guide optimization of the AI model 730 during training to minimize the loss function. The loss function may be presented via the ML framework 714, such that a user can determine whether to retrain or otherwise alter the algorithm 716 if the loss function is over a threshold. In some instances, the algorithm 716 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 726 adjusts the model parameters 722 to minimize the loss function during training of the algorithm 716. In other words, the optimizer 726 uses the loss function generated by the loss function engine 724 as a guide to determine what model parameters lead to the most accurate AI model 730. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 726 used may be determined based on the type of model structure 720 and the size of data and the computing resources available in the data layer 602.

The regularization engine 728 executes regularization operations. Regularization is a technique that prevents over- and under-fitting of the AI model 730. Overfitting occurs when the algorithm 716 is overly complex and too adapted to the training data, which can result in poor performance of the AI model 730. Underfitting occurs when the algorithm 716 is unable to recognize even basic patterns from the training data such that it cannot perform well on training data or on validation data. The regularization engine 728 can apply one or more regularization techniques to fit the algorithm 716 to the training data properly, which helps constraint the resulting AI model 730 and improves its ability for generalized application. Examples of regularization techniques include lasso (L1) regularization, ridge (L2) regularization, and elastic (L1 and L2 regularization).

The application layer 708 describes how the AI system 700 is used to solve problem or perform tasks. In an example implementation, the application layer 708 can include instructions for the process of FIG. 6.

Figure 8:
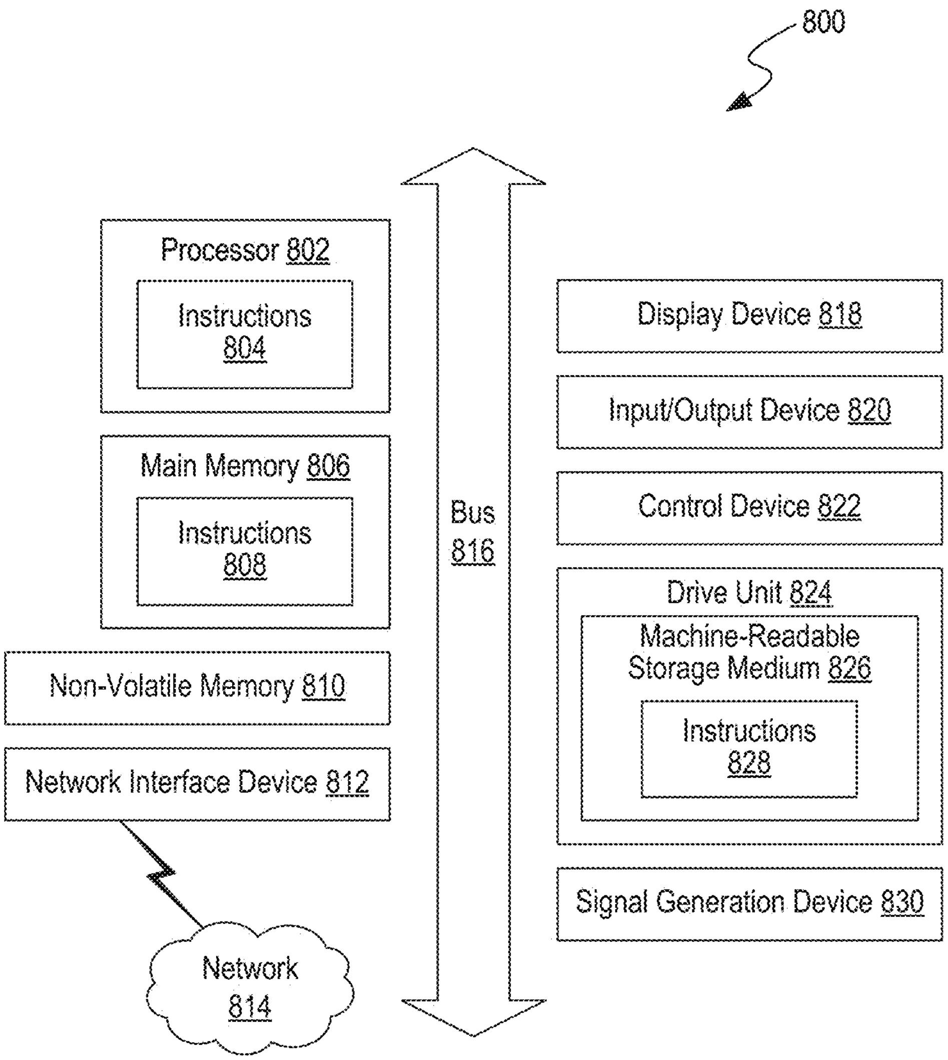
FIG. 8 is a block diagram that illustrates an example computer system in which at least some operations described herein can be implemented.

FIG. 8 is a block diagram that illustrates an example of a computer system 800 in which at least some operations described herein can be implemented. As shown, the computer system 800 can include: one or more processors 802, main memory 806, non-volatile memory 810, a network interface device 812, video display device 818, an input/output device 820, a control device 822 (e.g., keyboard and pointing device), a drive unit 824 that includes a storage medium 826, and a signal generation device 830 that are communicatively connected to a bus 816. The bus 816 represents one or more physical buses and/or point-to-point connections that are connected by appropriate bridges, adapters, or controllers. Various common components (e.g., cache memory) are omitted from FIG. 8 for brevity. Instead, the computer system 800 is intended to illustrate a hardware device on which components illustrated or described relative to the examples of the figures and any other components described in this specification can be implemented.

The computer system 800 can take any suitable physical form. For example, the computer system 800 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 800. In some implementations, the computer system 800 can be an embedded computer system, a system-on-chip (SOC), a single-board computer system (SBC) or a distributed system such as a mesh of computer systems or include one or more cloud components in one or more networks. Where appropriate, one or more computer systems 800 can perform operations in real-time, near real-time, or in batch mode.

The network interface device 812 enables the computer system 800 to mediate data in a network 814 with an entity that is external to the computer system 800 through any communication protocol supported by the computer system 800 and the external entity. Examples of the network interface device 812 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 806, non-volatile memory 810, machine-readable medium 826) can be local, remote, or distributed. Although shown as a single medium, the machine-readable medium 826 can include multiple media (e.g., a centralized/distributed database and/or associated caches and servers) that store one or more sets of instructions 828. The machine-readable (storage) medium 826 can include any medium that is capable of storing, encoding, or carrying a set of instructions for execution by the computer system 800. The machine-readable medium 826 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 810, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in computing device(s). When read and executed by the processor 802, the instruction(s) cause the computer system 800 to perform operations to execute elements involving the various aspects of the disclosure.

Remarks

The terms "example," "embodiment," and "implementation" are used interchangeably. For example, reference to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the embodiments. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the examples, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the embodiments, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the embodiments disclosed herein should not be taken to imply that the terminology is being redefined herein to be restricted to any specific characteristics, features, or aspects of the embodiments disclosed herein with which that terminology is associated. In general, the terms used in the following examples should not be construed to limit the embodiments disclosed herein to the specific examples disclosed herein, unless the above Detailed Description explicitly defines such terms. Accordingly, the actual scope of the embodiments disclosed herein encompasses not only the disclosed examples, but also all equivalent ways of practicing or implementing the embodiments disclosed herein under the examples. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the embodiments disclosed herein can be modified to employ the systems, functions, and concepts of the various references described above to provide yet further implementations of the embodiments disclosed herein.

To reduce the number of claims, certain implementations are presented below in certain forms, but the applicant contemplates various aspects of the embodiments disclosed herein in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A computer system comprising:

at least one hardware processor; and at least one non-transitory computer-readable storage medium storing instructions, which, when executed by the at least one hardware processor, cause the computer system to:

receive at least one alarm notification associated with at least one premises;

receive data associated with the at least one premises, wherein the data comprises RF signal data emitted from at least one electronic device present at the at least one premises;

analyze the data using at least one trained ML model and at least one static dataset associated with an initial account setup process;

based on the analysis of the data, generate at least one dynamic call list and generate at least one alarm priority level assigned to the at least one alarm notification, wherein the at least one dynamic call list comprises a list identifying at least one individual associated with the at least one premises; and transmit the at least one dynamic call list and the at least one alarm priority level.

2. The computer system of claim 1, wherein the at least one premises is a residential property.

3. The computer system of claim 1, wherein the at least one premises is a commercial property.

4. The computer system of claim 1, wherein the at least one trained ML model is trained on previous RF signal data that identifies a type of an electronic device and an associated user of the at least one electronic device.

5. The computer system of claim 1, wherein the at least one electronic device is an unknown device.

6. The computer system of claim 1, wherein the at least one static dataset associated with an initial account setup process comprises:

a default call list; and a list of known electronic devices mapped to contact information of individuals who own the known electronic devices.

7. The computer system of claim 1, wherein the dynamic call list is generated based on a proximity calculation of the at least one electronic device to the at least one premises.

8. The computer system of claim 1, wherein the dynamic call list is generated based on a recency calculation of at least one account owner, wherein the recency calculation is calculated based on the last time the at least one account owner was present at the at least one premises.

9. The computer system of claim 1, wherein the alarm priority level is generated based on a presence determination of at least one minor on the at least one premises.

10. The computer system of claim 1, wherein the alarm priority level is generated based on a time of day.

11. A computer-implemented method for generating a dynamic workflow, the computer-implemented method comprising:

receiving, using a computer system, at least one alarm notification, wherein the at least one alarm notification is associated with at least one premises and at least one account owner;

receiving, using a computer system, at least one dynamic call list, wherein the at least one dynamic call list comprises a list identifying at least one individual associated with the at least one premises and wherein the dynamic call list is generated based on at least one of a geographic location of at least one known resident of the at least one premises or a recency calculation of at least one known resident with respect to the at least one premises;

receiving, using a computer system, at least one alarm priority level, wherein the at least one alarm priority level indicates the potential seriousness of the at least one alarm notification;

based on receiving the dynamic call list, auto-dialing a first individual listed in the at least one dynamic call list;

establishing a call with the first individual;

receiving data from the call with the first individual, wherein the data comprises background noise and a conversation;

processing the background noise and the conversation using at least one trained ML model;

updating the at least one alarm priority level; and based on the at least one updated alarm priority level, notifying first responders of the at least one alarm notification, the at least one updated alarm priority level, and an address of the at least one premises.

12. The computer-implemented method of claim 11, wherein the background noise is glass shattering.

13. The computer-implemented method of claim 11, wherein the at least one updated alarm priority level is associated with a threat to property.

14. The computer-implemented method of claim 11, wherein the at least one alarm notification is associated with a carbon monoxide alarm.

15. The computer-implemented method of claim 11, wherein the at least one alarm notification is associated with a fire alarm.

16. The computer-implemented method of claim 11, comprising:

deprioritizing, based on the processed background noise and the conversation, the at least one alarm notification, wherein the at least one alarm notification is determined to be a false alarm.

17. The computer-implemented method of claim 11, comprising:

failing to establish a call with the first individual in the at least one dynamic call list;

auto-dialing a second individual in the at least one dynamic call list, wherein the second individual was previously on the at least one premises; and establishing a second call with the second individual.

18. A computer-implemented method for intelligently generating a dynamic workflow, the computer-implemented method comprising:

receiving at least one alarm notification associated with at least one premises;

receiving data associated with the at least one premises, wherein the data comprises data from at least one electronic device on the at least one premises;

analyzing the data using at least one ML model, wherein the at least one ML model is trained on historical data that identifies electronic devices based on data and behavioral patterns of the residents of the at least one premises;

based on the data analysis using the at least one ML model, generating a dynamic call list, wherein the dynamic call list comprises a list identifying at least one individual associated with the at least one premises and wherein the dynamic call list prioritizes individuals who are present at the at least one premises and deprioritizes minors;

based on the data analysis using the at least one ML model, assign a priority level to the at least one alarm notification, wherein the priority level indicates a predicted severity level of an alarm;

present the dynamic call list in at least one user interface;

present the priority level assigned to the at least one alarm notification in the at least one user interface; and automatically dial a first individual listed in the dynamic call list in the at least one user interface.

19. The computer-implemented method of claim 18, wherein the data associated with the at least one premises comprises data from at least one of: video data from at least one security camera installed on the at least one premises, television signal data from at least one smart television on the at least one premises, or alarm signal data from at least one alarm system on the at least one premises.

20. The computer-implemented method of claim 18, further comprising:

displaying an emergency 911 button in the at least one user interface, wherein the emergency 911 button automatically dispatches first responders to the at least one premises associated with the at least one alarm notification.

* * * * *